United States Patent
Hsieh et al.

(10) Patent No.: US 9,655,192 B2
(45) Date of Patent: May 16, 2017

(54) POWER SUPPLY METHOD, POWER SUPPLY SYSTEM, AND CARRIER MODULE THEREOF

(71) Applicant: Wistron Corp., New Taipei (TW)

(72) Inventors: Cheng Kuang Hsieh, New Taipei (TW); Chia Ming Tsai, New Taipei (TW); Hsien-Yu Wang, New Taipei (TW)

(73) Assignee: Wistron Corp., New Taipei (TW)

( * ) Notice: Subject to any disclaimer, the term of this patent is extended or adjusted under 35 U.S.C. 154(b) by 15 days.

(21) Appl. No.: 14/825,100

(22) Filed: Aug. 12, 2015

(65) Prior Publication Data

US 2016/0195906 A1 Jul. 7, 2016

(30) Foreign Application Priority Data

Jan. 6, 2015 (TW) .............................. 104100193 A

(51) Int. Cl.

| | | |
|---|---|---|
| *G06F 13/40* | (2006.01) | |
| *G06F 1/18* | (2006.01) | |
| *H05K 7/14* | (2006.01) | |
| *H05B 33/08* | (2006.01) | |
| *G06F 1/26* | (2006.01) | |
| *G06F 13/38* | (2006.01) | |

(52) U.S. Cl.
CPC ......... *H05B 33/0854* (2013.01); *G06F 1/187* (2013.01); *G06F 1/189* (2013.01); *G06F 1/26* (2013.01); *G06F 13/385* (2013.01); *G06F 13/4081* (2013.01); *H05B 33/0842* (2013.01)

(58) Field of Classification Search
CPC ........ G09G 2370/045; G09G 2330/021; G06F 13/4081; G06F 13/385; G06F 1/26; G06F 9/4411; G06F 13/4027; G06F 3/0601; G06F 1/266; G06F 11/3051; G06F 11/328; G06F 13/409; G06F 11/3055; G06F 1/3203; G06F 11/2023; H05K 7/1492

See application file for complete search history.

(56) References Cited

U.S. PATENT DOCUMENTS

| | | | |
|---|---|---|---|
| 6,498,716 B1 * | 12/2002 | Salinas ................... | G06F 1/189 307/150 |
| 2004/0190241 A1 * | 9/2004 | Cyphers .............. | H05K 7/1457 361/829 |
| 2005/0060490 A1 * | 3/2005 | Lu ....................... | G06F 13/4081 711/115 |

(Continued)

FOREIGN PATENT DOCUMENTS

| | | |
|---|---|---|
| TW | 505886 | 10/2002 |
| TW | 555040 U | 9/2003 |

*Primary Examiner* — Adam B Dravininkas

(57) ABSTRACT

A carrier module is provided for supporting at least one data storage device. The carrier module is electrically connected to a power supply module. The carrier module includes a main body, a first socket, a second socket, a connecting port, and a detection unit. The first socket, the second socket, and the connecting port are disposed on the main body. The connecting port and the detection unit are electrically connected to the first and second sockets. The data storage device is detachably connected to the connecting port. The detection unit detects whether the power supply module is electrically connected to the first socket or the second socket.

10 Claims, 13 Drawing Sheets

(56) References Cited

U.S. PATENT DOCUMENTS

| | | | |
|---|---|---|---|
| 2007/0217125 A1* | 9/2007 | Johnson | H02J 9/062 361/600 |
| 2007/0255814 A1* | 11/2007 | Green | H04L 67/16 709/223 |
| 2008/0028238 A1* | 1/2008 | Lucas | G06F 1/26 713/300 |
| 2008/0318465 A1* | 12/2008 | Johnsen | G06F 11/30 439/488 |
| 2009/0242265 A1* | 10/2009 | Doorhy | H05K 7/1457 174/494 |
| 2011/0197252 A1* | 8/2011 | Gottumukkala | H04M 7/125 725/148 |
| 2011/0245988 A1* | 10/2011 | Ingels | G06F 1/26 700/295 |

* cited by examiner

POWER SUPPLY METHOD, POWER SUPPLY SYSTEM, AND CARRIER MODULE THEREOF

CROSS REFERENCE TO RELATED APPLICATIONS

The present application is based on, and claims priority from, Taiwan Patent Application No. 104100193, filed on Jan. 6, 2015, the disclosure of which is hereby incorporated by reference herein in its entirety.

BACKGROUND OF THE INVENTION

Field of the Invention

The application relates in general to a power supply method, a power supply system, and a carrier module thereof. Particularly, the application relates to a carrier module having a detection unit, and a power supply system and a power supply method comprising the aforementioned carrier module.

Description of the Related Art

As shown in FIG. 1, in a data center, a carrier U used to store hard disks H is usually disposed in a housing R in a slidable manner for easily changing or maintaining the hard disks H. Because the electric power should be supplied through a wire W and the carrier U to the hard disks H, the wire W should be connected to the carrier U even if the carrier U slides. However, the wire W may be broken by dragging in the long term usage. If the wire W is broken, electric power cannot be supplied to the hard disks H, and the data stored in the hard disks H may be lost or damaged.

BRIEF SUMMARY OF INVENTION

To address the aforementioned deficiency of conventional electronic products, an embodiment of the invention provides a carrier module, electrically connected to a power supply module, for supporting at least one data storage device. The carrier module includes a main body, a first socket, a second socket, a connecting port, and a detection unit. The first socket, the second socket, and the connecting port are disposed on the main body. The connecting port and the detection unit are electrically connected to the first and second sockets. The data storage device is detachably connected to the connecting port. The detection unit detects whether the power supply module is electrically connected to the first socket or the second socket.

In some embodiments, the first socket and the second socket are disposed on the opposite sides of the main body.

In some embodiments, the carrier module further comprises a plurality of connecting ports, disposed on the main body and electrically connected to the first socket and the second socket, wherein a plurality of data storage devices are detachably connected to the respective connecting ports.

In some embodiments, the carrier module further comprises a processor, electrically connected to the detection unit.

In some embodiments, the carrier module further comprises at least one LED, electrically connected to the processor.

In some embodiments, the carrier module further comprises a switching unit for interrupting the electrical connection between the power supply module and the connecting port, electrically connected to the first socket, the second socket, and the connecting port.

A power supply system is also provided, comprising a rack, a power supply module, and the aforementioned carrier module.

In some embodiments, the power supply system further comprises a first plug and a second plug, electrically connected to the power supply module, and the first plug and the second plug are detachably connected to the first socket and the second socket, respectively.

In some embodiments, the second plug is connected to the first power supply.

In some embodiments, the second plug is connected to the busbar.

In some embodiments, the power supply module further comprises a second power supply, and the second plug is connected to the second power supply.

In some embodiments, the power supply module further comprises third power supply electrically connected to the busbar.

A power supply method for providing electric power to at least one data storage device is also provided, comprising: providing a power supply module; providing a first plug and a second plug, wherein the first plug and the second plug are electrically connected to the power supply module; providing the aforementioned carrier module; electrically connecting the first plug to the first socket; and the detection unit detecting whether the second plug is electrically connected to the second socket.

In some embodiments, the power supply method further comprises: when the detection unit detects that the second plug is electrically connected to the second socket, the detection unit transmits an electrical signal to the processor, and the processor transmits a driving signal to the LED to enable the LED to emit light.

In some embodiments, the power supply method further comprises: when the detection unit detects that the second plug is electrically connected to the second socket, the switching unit interrupts the electrical connection between the first plug and the connecting port.

In some embodiments, the power supply method further comprises: when the detection unit detects that the second plug is electrically connected to the second socket, the processor transmits a switching signal to the switching unit, and the switching unit interrupts the electrical connection between the first plug and the connecting port according to the switching signal.

In some embodiments, the power supply method further comprises: after the electrical connection between the first plug and the connecting port is interrupted, separating the first plug and the first socket.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The embodiments of the power supply system and the carrier module thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
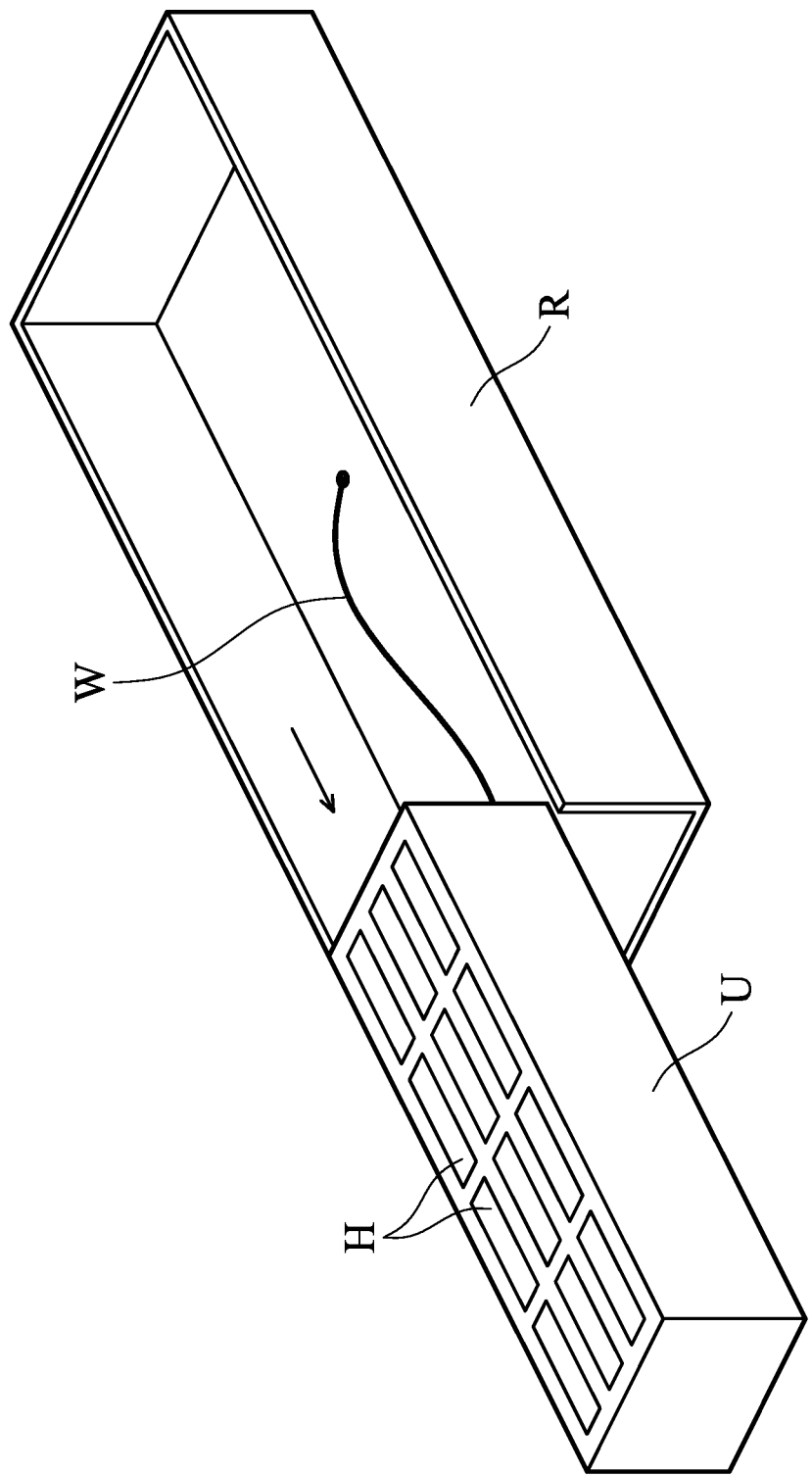
FIG. 1 is a schematic diagram illustrating a conventional wire connected to a carrier.
Figure 2:
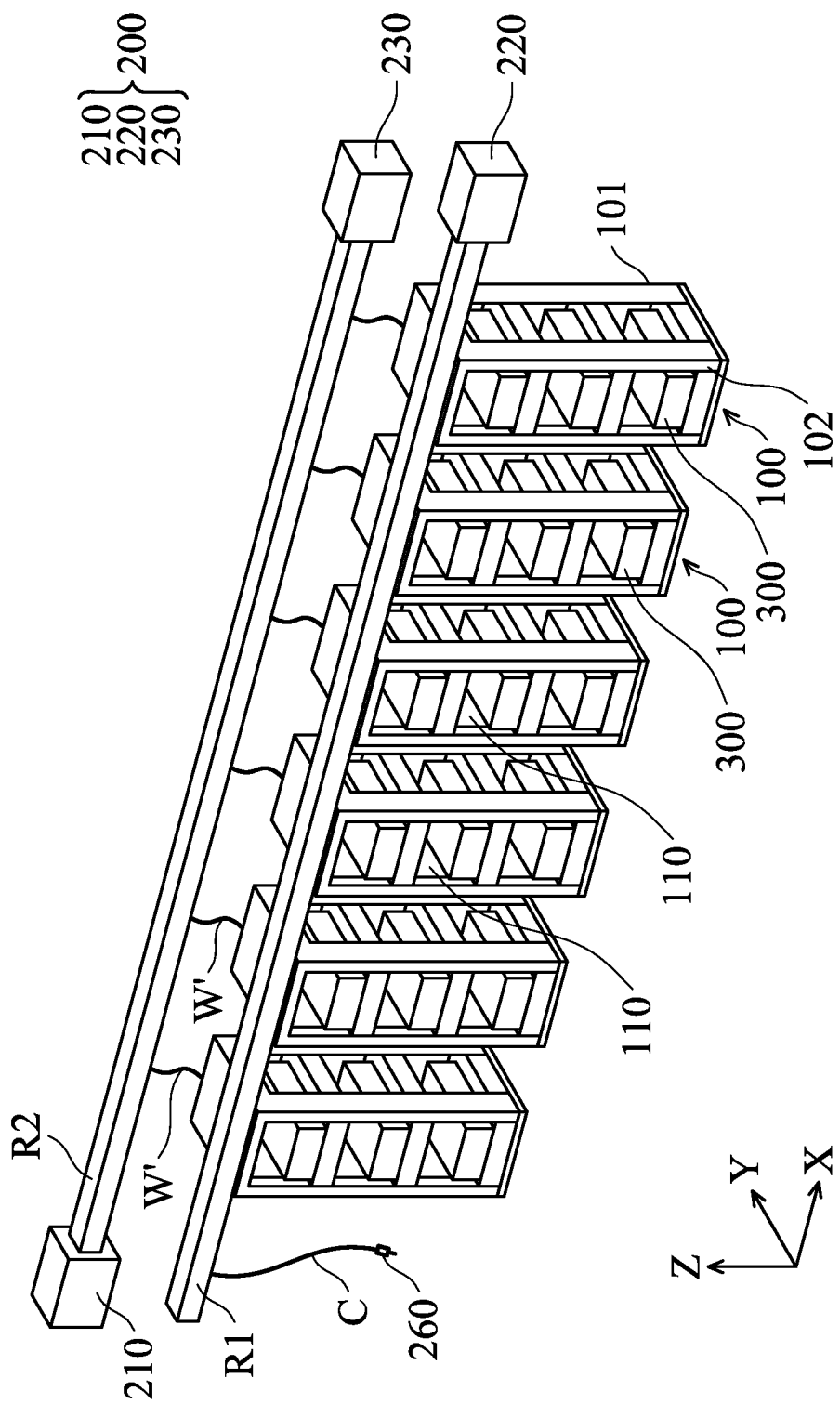
FIG. 2 is a schematic diagram of a power supply system according to an embodiment of the invention.

As shown in FIG. 2, a power supply system in an embodiment primarily comprises a plurality of racks 100 parallel to each other, a power supply module 200, and a plurality of carrier modules 300. The power supply module 200 is disposed on the top of the racks 100 by cantilevers R1 and R2, so that the space can be used effectively. The carrier modules 300 are disposed in the rack 100 in a slidable manner, and electrically connected to the power supply module 200 through wires W'. The structures of the rack 100, the power supply module 200, and a carrier module 300 are discussed in detail below.

Figure 3B:
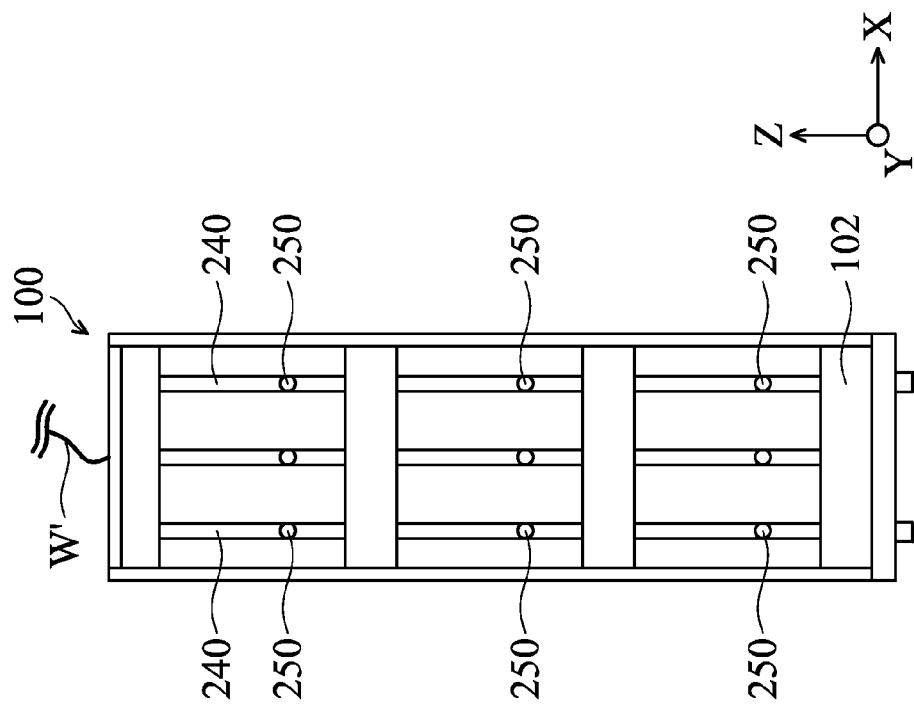
FIG. 3B is a front view of the rack according to an embodiment of the invention.
Figure 3A:
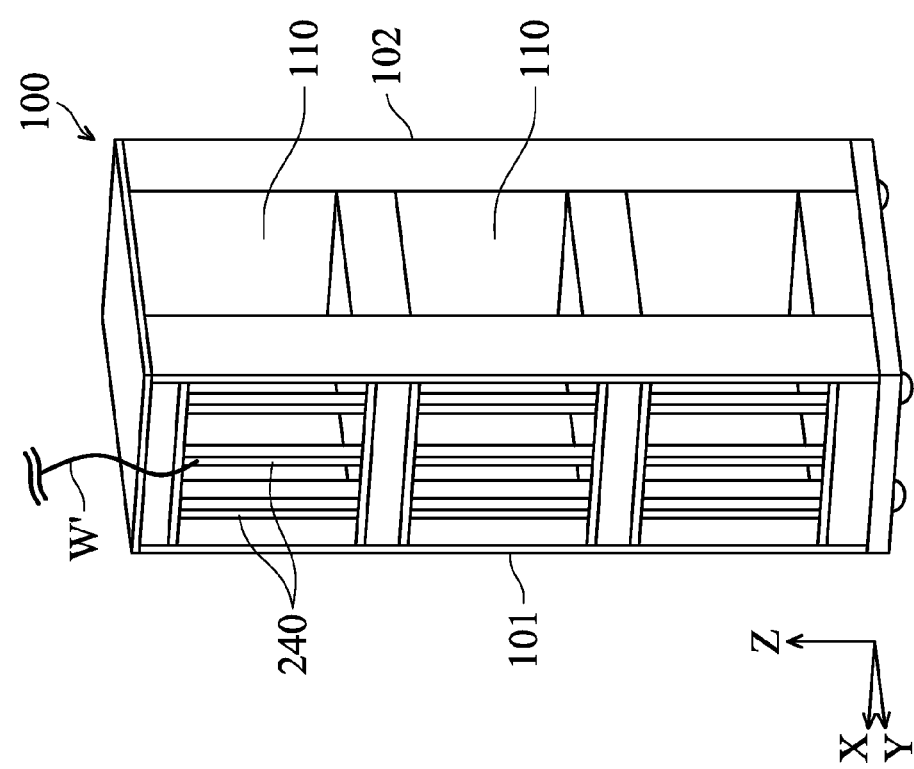
FIG. 3A is a perspective diagram of a rack according to an embodiment of the invention.

Referring to FIGS. 2, 3A, and 3B, in this embodiment, the rack 100 comprises a plurality of accommodating spaces 110 and a plurality of busbars 240. The accommodating spaces 110 are formed between the first side 101 and the second side 102 of the rack 100 for accommodating the aforementioned carrier modules 300 (FIG. 2). The busbars 240 are disposed on the first side 101 of the rack 100 at regular intervals, and at least one first plug 250 is disposed on the busbar 240. In this embodiment, a plurality of first plugs 250 are disposed on each of the busbar 240 at regular intervals along Z-axis (FIG. 3B). As shown in FIG. 2, the power supply module 200 comprises a first power supply 210, a second power supply 220, and a third power supply 230, wherein the first and third power supplies 210 and 230 are electrically connected to the busbars 240 through the wires W'. The third power supply 230 is a backup power source. The first power supply 210 provides electric power to the busbars 240 in the normal state, and if the power supply condition is abnormal, the electric power to the busbars 240 is switched to be supplied from the third power supply 230. Furthermore, a second plug 260 and the second power supply 220 are electrically connected to each other by a wire C. The second plug 260 can be extended to the front side (second side 102) of the rack 100.

Figure 4:
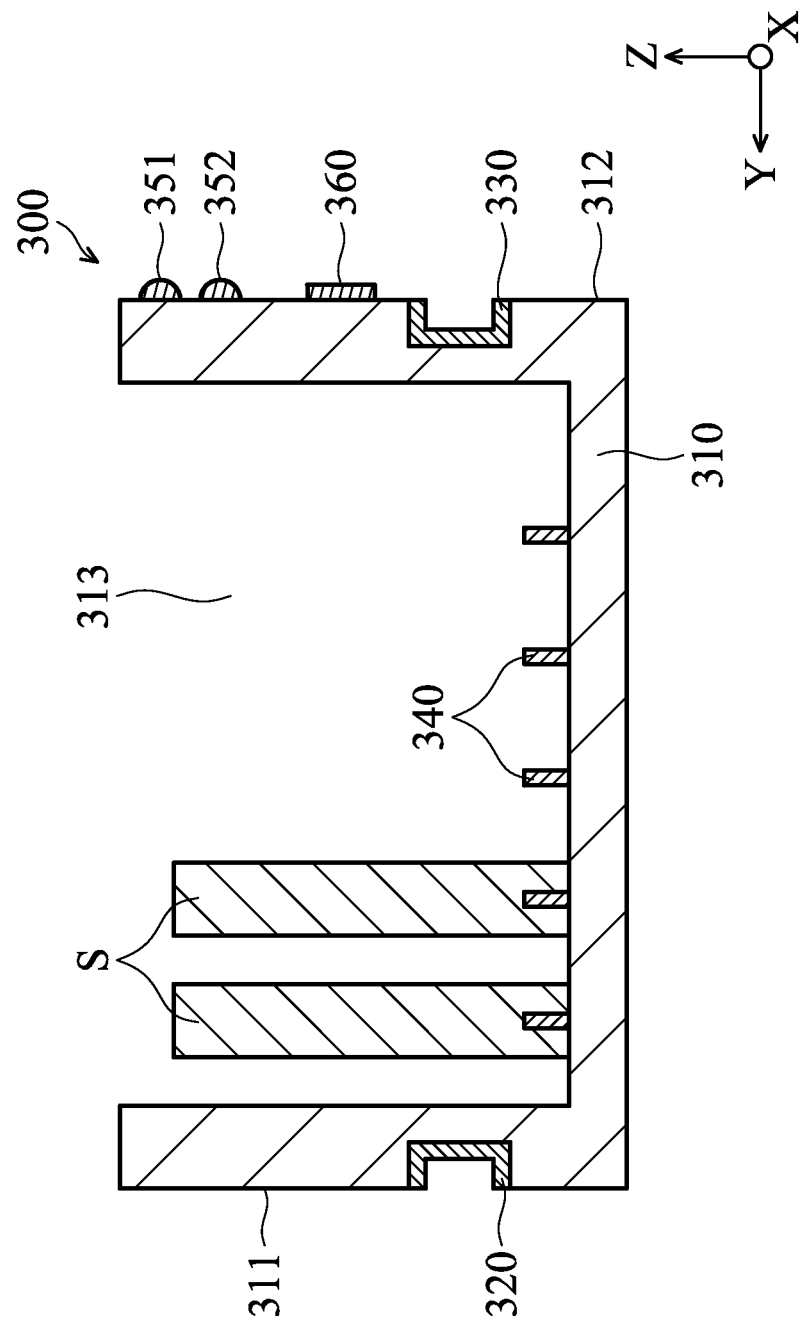
FIG. 4 is a cross-sectional view of a carrier module according to an embodiment of the invention.

Referring to FIG. 4, the carrier modules 300 are used to connect and support one or a plurality of data storage devices S (for example, the hard disks), and primarily comprise a main body 310, a first socket 320, a second socket 330, a plurality of connecting ports 340, two light emitting diodes (LEDs) 351 and 352, and a button 360. The main body 310 includes a first end 311, a second end 312, and a recess 313, wherein the first and second ends 311 and 312 are located at the opposite sides of the carrier module 300. The first socket 320 is disposed on the first end 311, and the second socket 330, the LEDs 351 and 352, and the button 360 are disposed on the second end 312. The connecting ports 340 are disposed in the recess 313 for connecting the data storage devices S. The data storage devices S are detachably connected to the connecting ports 340 and accommodated in the recess 313.

Figure 5:
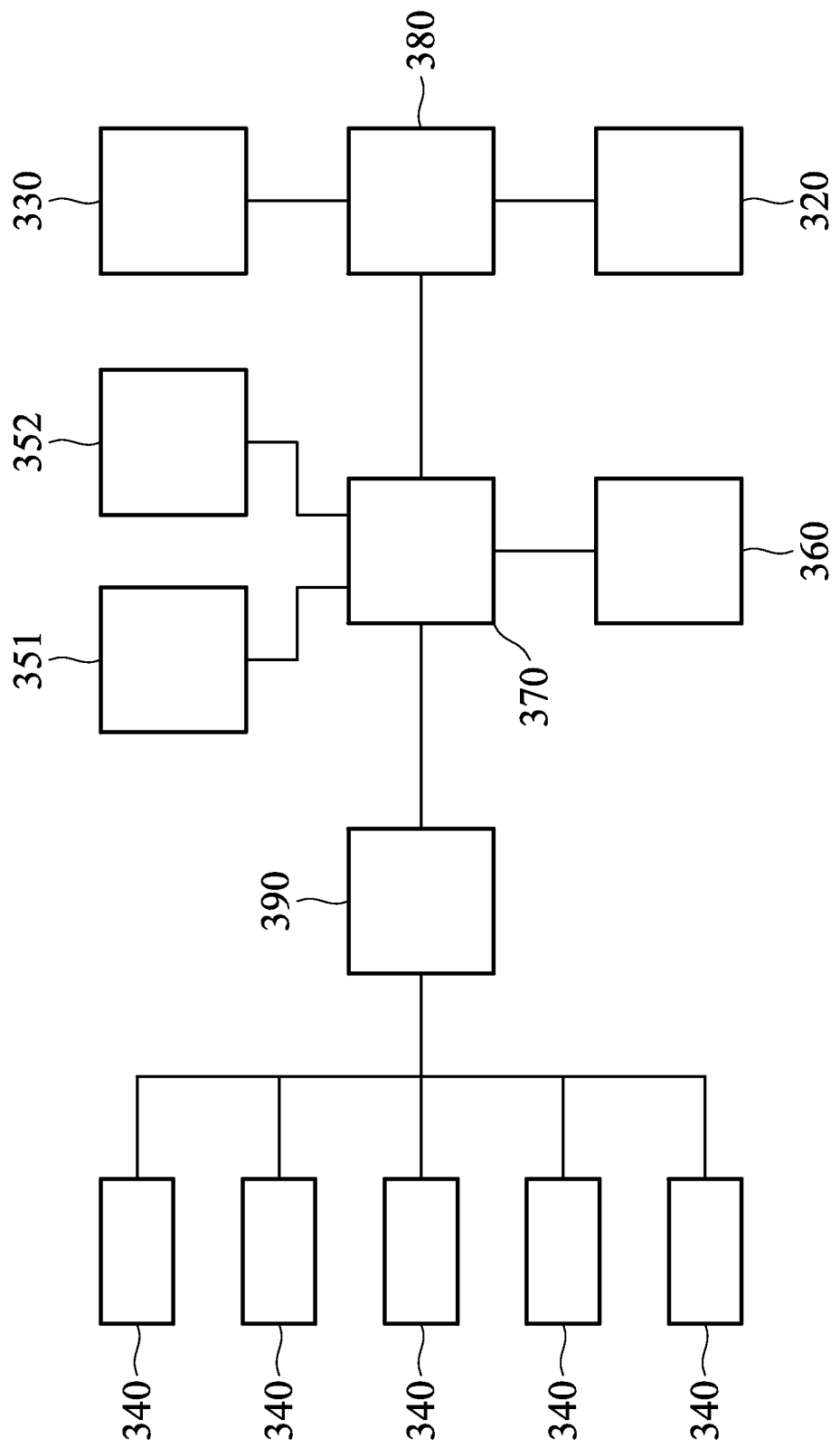
FIG. 5 is a schematic diagram of a circuit system in the carrier module according to another embodiment of the invention.

FIG. 5 is a schematic diagram of a circuit system in the carrier module 300 according to an embodiment of the invention. Referring to FIGS. 4 and 5, the circuit system in the carrier module 300 comprises a processor 370, a detection unit 380, and a switching unit 390. The first socket 320 and the second socket 330 are electrically connected to the detection unit 380. The processor 370 is electrically connected to the button 360, the detection unit 380, the switching unit 390, and the LEDs 351 and 352. Furthermore, the switching unit 390 is electrically connected to the connecting ports 340.

Figure 6:
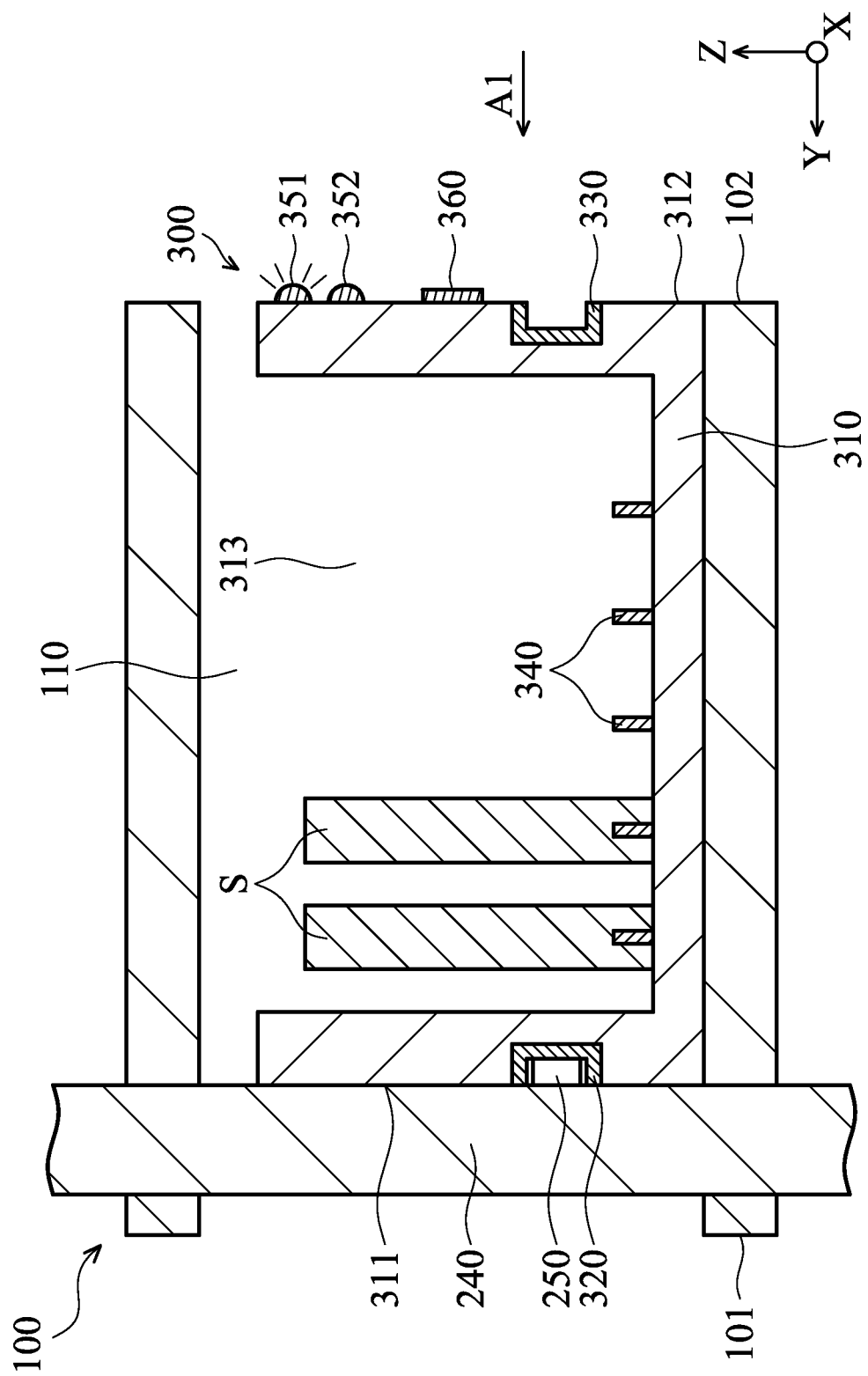
FIG. 6 is a schematic diagram illustrating that the carrier module moves along a first direction into an accommodating space according to another embodiment of the invention.

As shown in FIG. 6, when the carrier module 300 is pushed from the second side 102 of the rack 110 along a first direction A1 into the accommodating space 110, the first end 311 of the carrier module 300 is adjacent to the first side 101 of the rack 100, the second end 312 is adjacent to the second side 102 of the rack 100, and the first plug 250 on the busbar 240 is joined to the first socket 320. At this time, the detection unit 380 can detect the connection between the first plug 250 and the first socket 320, and transmit an electrical signal to the processor 370. Subsequently, the processor 370 transmits a driving signal to the LED 351, and the LED 351 emits light to indicate that the power supply module 200 is successfully providing electric power to the data storage devices S through the first socket 320.

Figure 7:
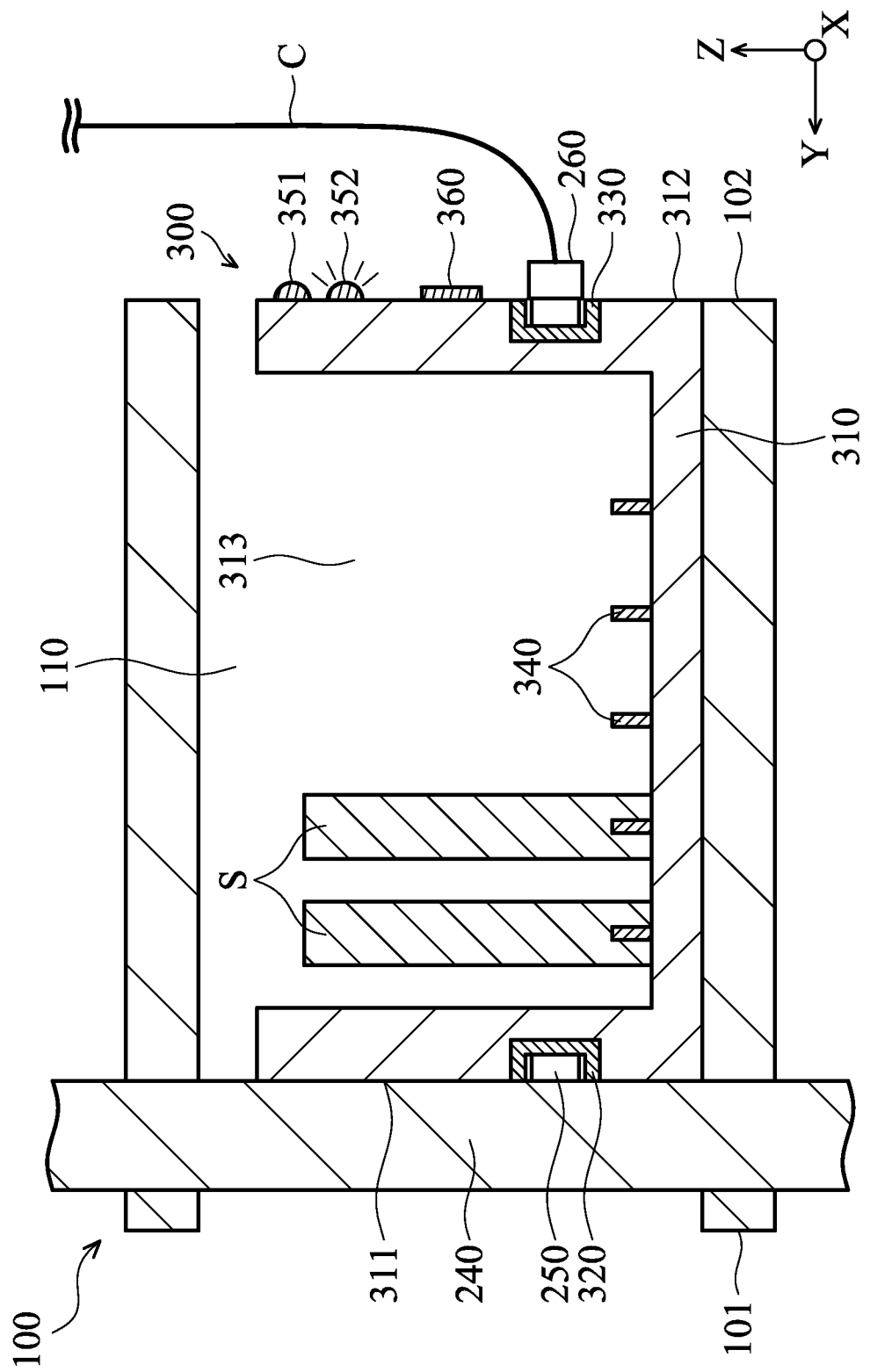
FIG. 7 is a schematic diagram illustrating a second plug inserted into a second socket according to another embodiment of the invention.
Figure 8:
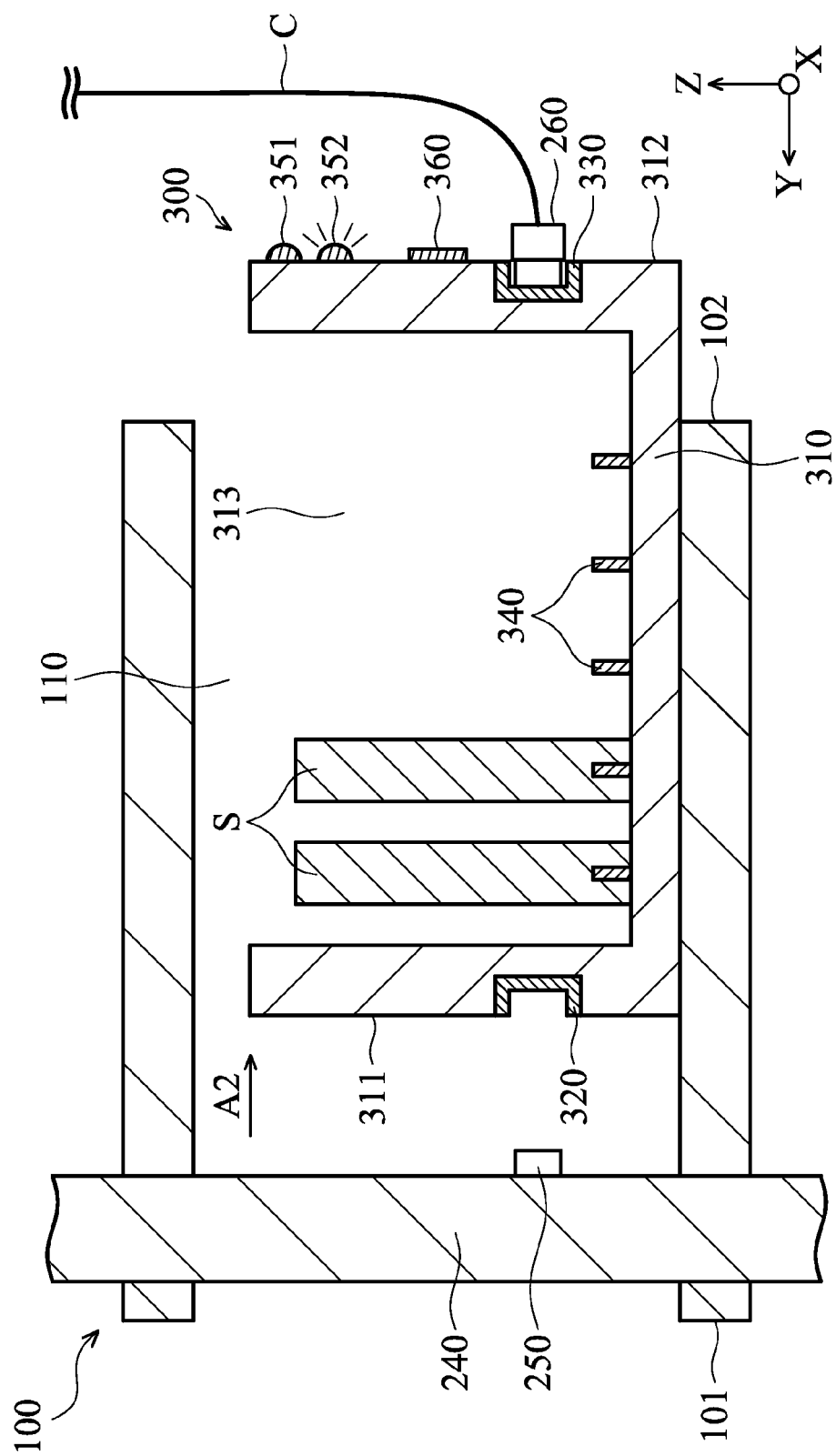
FIG. 8 is a schematic diagram illustrating that the carrier module leaves the accommodating space along a second direction according to another embodiment of the invention.

Referring to FIG. 7, when the user wants to remove the carrier module 300 from the second side 102 to maintain or change the data storage devices S in the recess 313, the second plug 260 can be inserted into the second socket 330 to prevent any interruption of the power supply. The detection unit 380 can detect the connection between the second plug 260 and the second socket 330, and transmit an electrical signal to the processor 370. Subsequently, the processor 370 transmits a driving signal to the LED 352, and the LED 352 emits light. In this state, the power supply module 200 can provide electric power through the wire C and the second socket 330 to the data storage devices S. When the user notices that the LED 352 emits light, he can push the button 360 to switch the carrier module 300 from a first state to a second state. At this time, the button 360 transmits an electrical signal to the processor 370, the processor 370 transmits a switching signal to the switching unit 390, and the switching unit 390 interrupts the electrical connection between the first plug 320 and the connecting ports 340 according to the switching signal. Simultaneously, the processor 370 stops transmitting the driving signal to the LED 351, such that the LED 351 does not emit light. As shown in FIG. 8, when the user notices that the LED 351 does not emit light, he can pull out the carrier module 300 from the accommodating space 110 along a second direction A2 without any interruption of the power supply, and the first plug 250 can leave the first socket 320 safely. The second direction A2 is opposite to the first direction A1.

When the maintenance or replacement of the data storage devices S is finished, the user can push the carrier module 300 back along the first direction A1 into the accommodating space 110, such that the first plug 250 is electrically connected to the first socket 320, and the LED 351 emits light again. When the user notices that the LED 351 is emitting light, he can push the button 360 to transmit an electrical signal to the processor 370, and the carrier module 300 is switched from the second state to the first state. The processor 370 transmits a switching signal to the switching unit 390, and the switching unit 390 interrupts the electrical connection between the second plug 260 and the connecting ports 340 according to the switching signal. Simultaneously, the processor 370 stops transmitting the driving signal to the LED 352, such that the LED 352 does not emit light. In this state, the user can separate the second plug 260 from the second socket 330 safely, and the carrier module 300 can resume the storage state, as shown in FIGS. 2 and 6.

It should be noted that the button 360 can comprise various types of switches, such as a toggle switch or light switch. In some embodiments, the carrier module 300 comprises only one LED, and the processor 370 merely transmits the driving signal to the LED when the first and second plugs 250 and 260 are respectively inserted into the first and second sockets 320 and 330 to enable the LED to emit light. In some embodiments, the carrier module 300 further comprises a signal lamp (not shown) electrically connected to the processor 370. The signal lamp is disposed on the second end 312 of the main body 310. When the user pushes the button 360 and the first and second plugs 250 and 260 separate from the first and second sockets 320 and 330, the processor 370 transmits a driving signal to the signal lamp to enable the signal lamp to emit light. The signal lamp can thereby notify the user of an operational error.

In another embodiment, the button 360 in the carrier module 300 can be omitted. When the first plug 250 connects with the first socket 320 and the user inserts the second plug 260 into the second socket 330 (as shown in FIG. 7), the processor 370 can directly transmit the switching signal to the switching unit 390, and the switching unit 390 interrupts the electrical connection between the first plug 250 and the connecting ports 340 according to the switching signal. Similarly, when the second plug 260 connects with the second socket 330 and the user inserts the first plug 250 into the first socket 320, the processor 370 can directly transmit the switching signal to the switching unit 390, and the switching unit 390 interrupts the electrical connection between the second plug 260 and the connecting ports 340 according to the switching signal.

Figure 9:
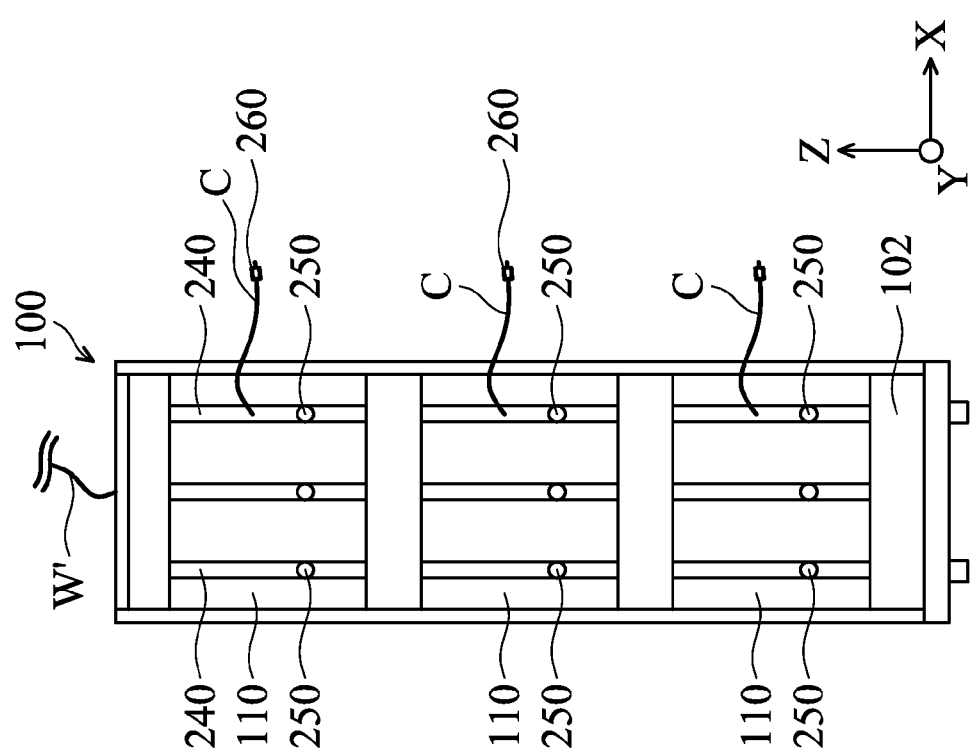
FIG. 9 is a front view of the rack according to another embodiment of the invention.
Figure 10:
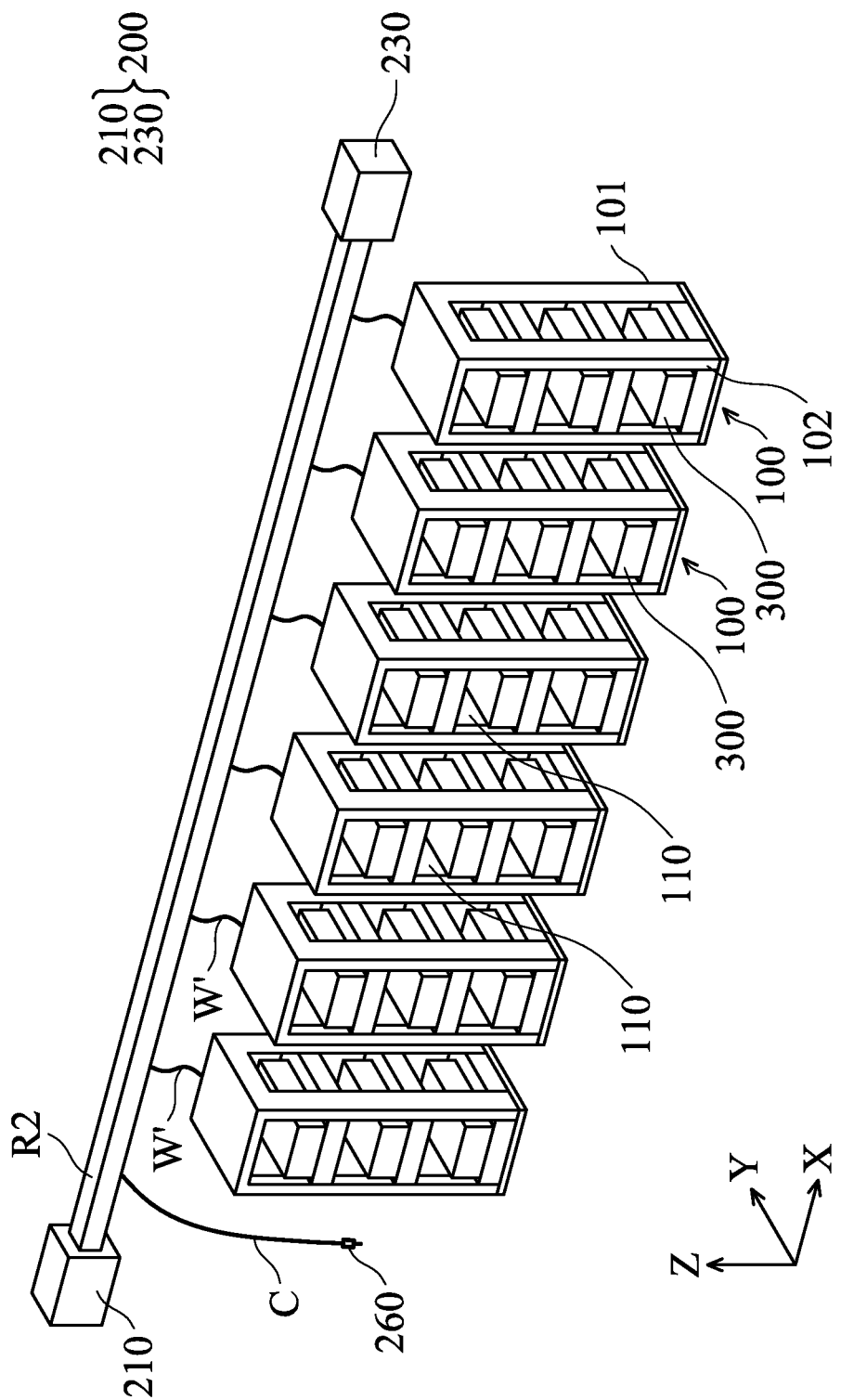
FIG. 10 is a schematic diagram of a power supply system according to another embodiment of the invention.
Figure 11:
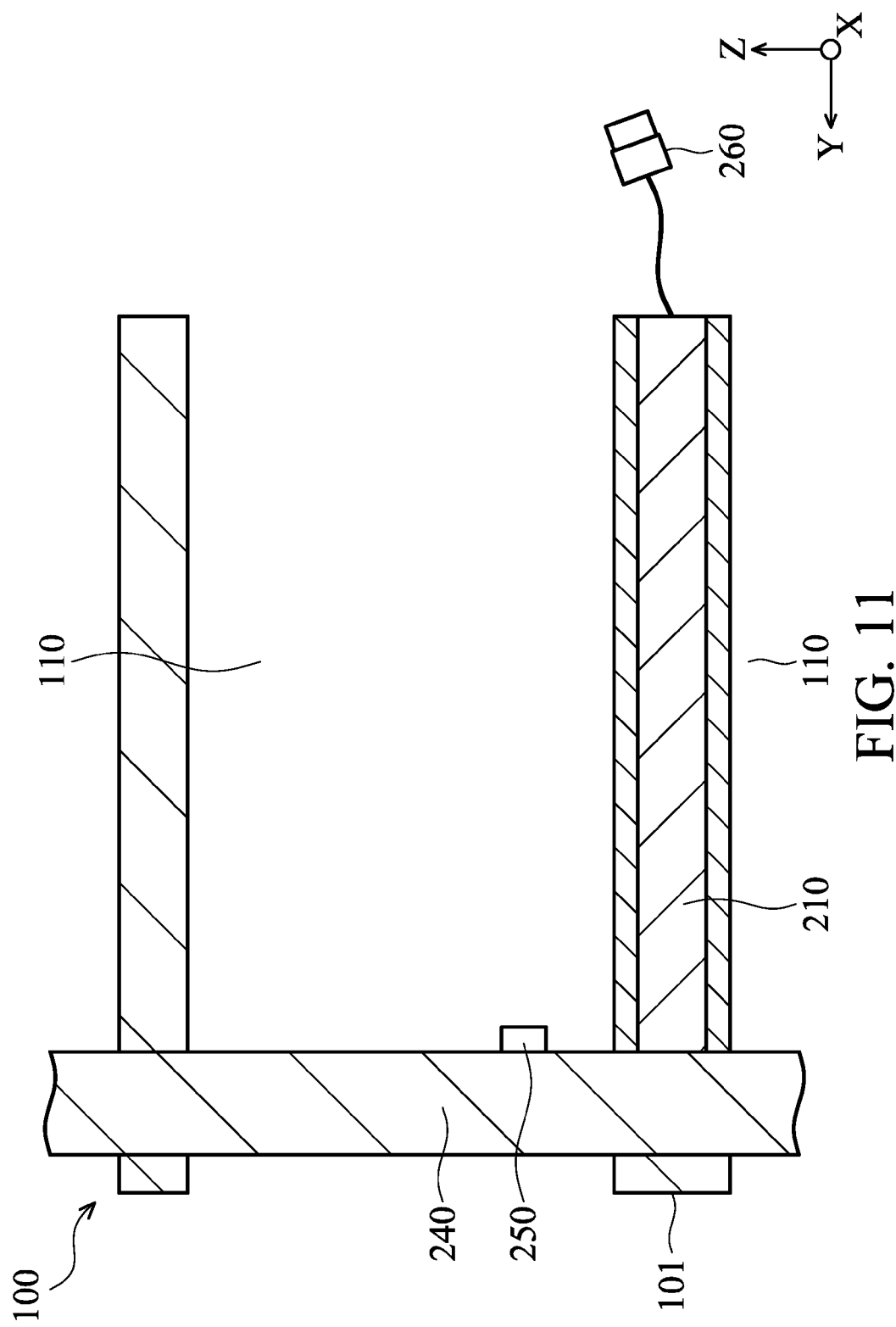
FIG. 11 is a schematic diagram illustrating a first power supply disposed between adjacent accommodating spaces according to another embodiment of the invention.

It should be noted that the locations and relationships between the first power supply 210, the second power supply 220, the third power supply 230, the first plug 250, and the second plug 260 can be adjusted as required. For example, as shown in FIG. 9, in another embodiment of the invention, the second plugs 260 can be extended through the accommodating space 110 to the front side (second side 102) of the rack 100 via the wires C. As shown in FIG. 10, in another embodiment, the second plug 260 is directly electrically connected to the first power supply 210, such that the cantilevers R1 and the second power supply 220 can be omitted. Otherwise, as shown in FIG. 11, in another embodiment, the first power supply 210 is disposed between the adjacent accommodating spaces 110, and the second plug 260 and the busbar 240 are respectively electrically connected to the front side and back side of the first power supply 210.

Figure 12A:
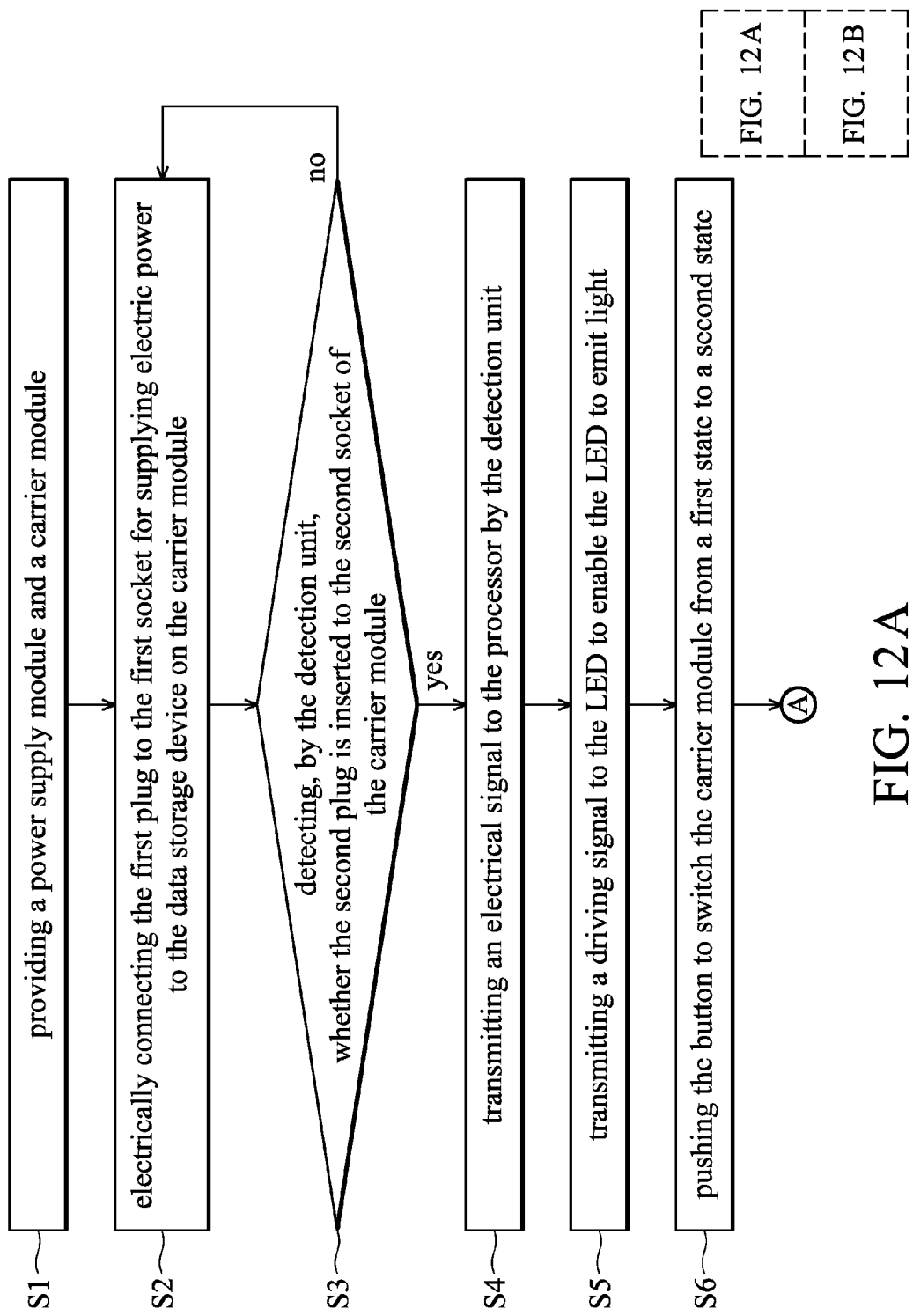
FIGS. 12A and 12B are flow charts of a power supply method according to an embodiment of the invention.
Figure 12:
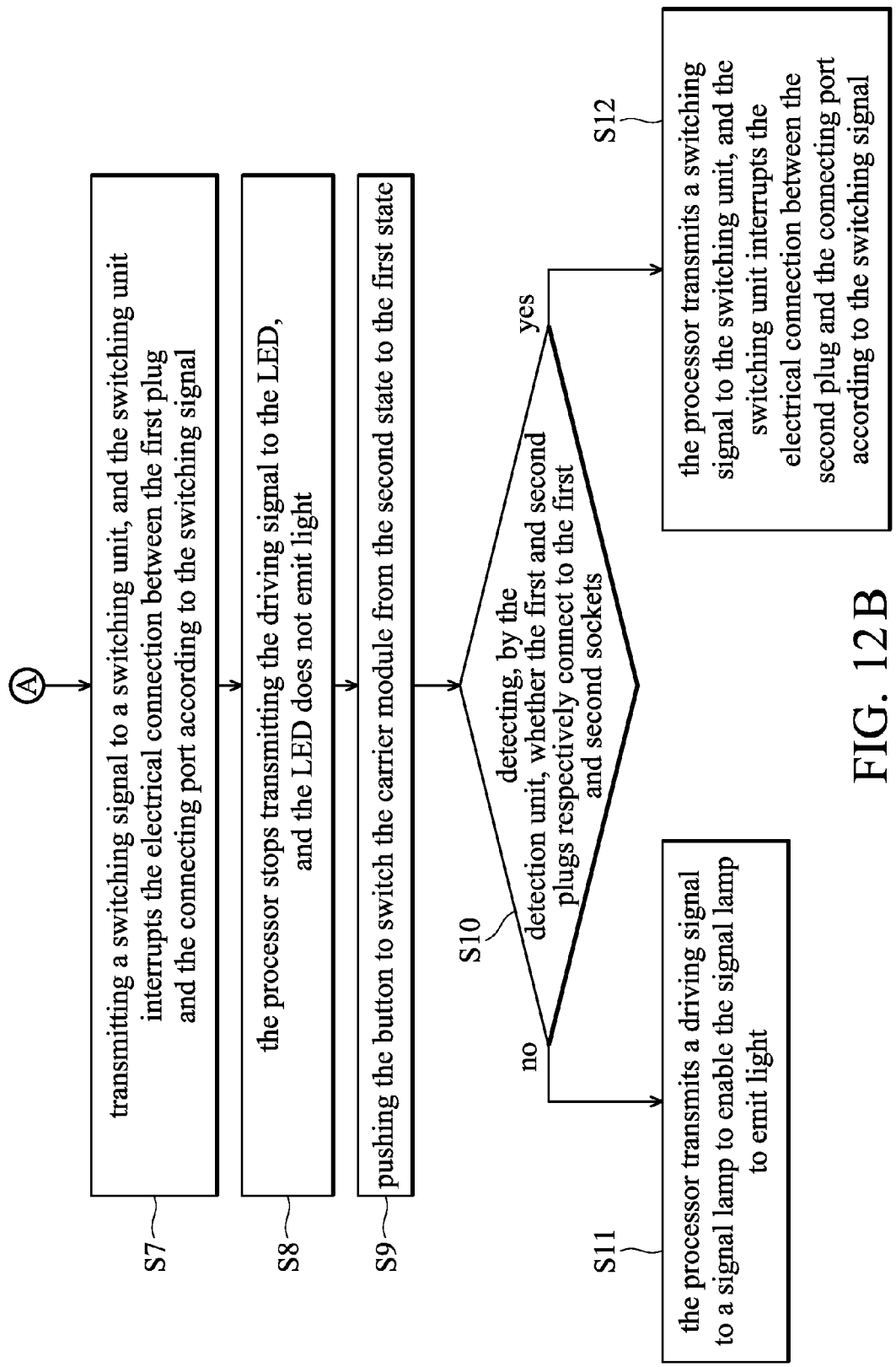

A power supply method for supplying electric power to at least one data storage device S is further provided according to the aforementioned detail (FIGS. 12A and 12B). First, a power supply module 200 and a carrier module 300 are provided (step S1), and a first plug 250 of the power supply module 200 is connected to a first socket 320 of the carrier module 300 for supplying electric power to the data storage device S on the carrier module 300 (step S2). The first plug 250 is electrically connected to the first and third power supplies 210 and 230 (as shown in FIGS. 2, 3A, and 3B). Second, a detection unit 380 detects whether a second plug 260 of the power supply module 200 is inserted to a second socket 330 of the carrier module 300 (step S3), wherein the second plug 260 is connected to a second power supply 220 (as shown in FIG. 2). If the second plug 260 is not inserted to a second socket 330, then the process returns to step S2. If the second plug 260 is inserted to a second socket 330, then the detection unit 380 transmits an electrical signal to a processor 370 (step S4).

Next, the processor 370 transmits a driving signal to a LED 352 to enable the LED 352 to emit light (step S5). The user can push the button 360 to switch the carrier module 300 from a first state to a second state (step S6). The processor transmits a switching signal to a switching unit 390, and the switching unit 390 interrupts the electrical connection between the first plug 320 and the connecting port 340 according to the switching signal (step S7). At this time, the processor 370 stops transmitting the driving signal to the LED 351, and the LED 351 does not emit light (step S8).

After step S8, the user can remove the carrier module 300 from the rack 100 to maintain or change the data storage device S. After the maintenance or replacement is finished, the user can push the carrier module 300 back into the accommodating space 110, so that the first plug 250 is electrically connected to the first socket 320. The user can push the button 360 to switch the carrier module 300 from the second state to the first state (step 9). Subsequently, the detection unit 380 detects whether the first and second plugs 250 and 260 respectively connect to the first and second sockets 320 and 330 (step S10). If the first and second plugs 250 and 260 do not respectively connect to the first and second sockets 320 and 330, the processor 370 transmits a driving signal to a signal lamp to enable the signal lamp to emit light (step S11). If the first and second plugs 250 and 260 respectively connect to the first and second sockets 320 and 330, the processor 370 transmits a switching signal to the switching unit 390, and the switching unit 390 interrupts the electrical connection between the second plug 330 and the connecting port 340 according to the switching signal (step S12).

In summary, a power supply method, a power supply system, and a carrier module thereof are provided in the invention. The unique structure of the supply system and the carrier module allows the data storage device to be easily maintained or changed. Furthermore, the electric power can be continuously provided to the data storage device during the maintenance process, so as to prevent breakage of the wire caused by dragging.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A carrier module for supporting at least one data storage device and electrically connected to a power supply module, the carrier module comprising:
    a main body;
    a first socket, disposed on the main body;
    a second socket, disposed on the main body;
    a connecting port, disposed on the main body and electrically connected to the first socket and the second socket, wherein the data storage device is detachably connected to the connecting port;
    a detection unit, electrically connected to the first socket and the second socket, and detecting whether the power supply module is electrically connected to the first socket or the second socket; and
    a switching unit electrically connected to the first socket, the second socket, and the connecting port, wherein when the detection unit detects that the power supply module is electrically connected to the second socket, the switching unit interrupts the electrical connection between the first socket and the connecting port.

2. The carrier module as claimed in claim 1, wherein the first socket and the second socket are disposed on the opposite sides of the main body.

3. The carrier module as claimed in claim 1, wherein the carrier module further comprises a plurality of connecting ports, disposed on the main body and electrically connected to the first socket and the second socket, wherein a plurality of data storage devices are detachably connected to the respective connecting ports.

4. The carrier module as claimed in claim 1, wherein the carrier module further comprises a processor, electrically connected to the detection unit.

5. The carrier module as claimed in claim 4, wherein the carrier module further comprises at least one LED, electrically connected to the processor.

6. A power supply method for providing electric power to at least one data storage device, the power supply method comprising:
    providing a power supply module;
    providing a first plug and a second plug, wherein the first plug and the second plug are electrically connected to the power supply module;
    providing a carrier module, comprising:
        a main body;
        a first socket, disposed on the main body;
        a second socket, disposed on the main body;
        a connecting port, disposed on the main body and electrically connected to the first socket and the second socket, wherein the data storage device is detachably connected to the connecting port;
        a detection unit, electrically connected to the first socket and the second socket; and
        a switching unit electrically connected to the first socket, the second socket, and the connecting port;
    electrically connecting the first plug to the first socket; and
    detecting, by the detection unit, whether the second plug is electrically connected to the second socket, wherein when the detection unit detects that the second plug is electrically connected to the second socket, the switching unit interrupts the electrical connection between the first plug and the connecting port.

7. The power supply method as claimed in claim 6, wherein the first socket and the second socket are disposed on opposite sides of the main body.

8. The power supply method as claimed in claim 6, wherein the carrier module further comprises a processor and at least one LED, and the processor is electrically connected to the detection unit and the LED, wherein when the detection unit detects that the second plug is electrically connected to the second socket, the detection unit transmits an electrical signal to the processor, and the processor transmits a driving signal to the LED to enable the LED to emit light.

9. The power supply method as claimed in claim 6, wherein the carrier module further comprises a processor, and the switching unit is further electrically connected to the processor, wherein when the detection unit detects that the second plug is electrically connected to the second socket, the processor transmits a switching signal to the switching unit, and the switching unit interrupts the electrical connection between the first plug and the connecting port according to the switching signal.

10. The power supply method as claimed in claim 6, wherein the power supply method further comprises:
    after the electrical connection between the first plug and the connecting port is interrupted, separating the first plug and the first socket.

* * * * *